(12) United States Patent
Lvovsky et al.

(10) Patent No.: US 7,949,245 B2
(45) Date of Patent: May 24, 2011

(54) READING MACHINE WITH CAMERA POLARIZER LAYERS

(75) Inventors: Lev Lvovsky, Waban, MA (US); Rafael Maya Zetune, Brighton, MA (US); Paul Albrecht, Brighton, MA (US); Raymond C. Kurzweil, Newton, MA (US)

(73) Assignee: K-NFB Reading Technology, Inc., Wellesley Hills, MA (US)

( * ) Notice: Subject to any disclaimer, the term of this patent is extended or adjusted under 35 U.S.C. 154(b) by 459 days.

(21) Appl. No.: 11/689,569

(22) Filed: Mar. 22, 2007

(65) Prior Publication Data

US 2008/0231950 A1 Sep. 25, 2008

(51) Int. Cl.
*G03B 15/03* (2006.01)
*H04N 5/222* (2006.01)
(52) U.S. Cl. .................................. 396/155; 348/370
(58) Field of Classification Search ............ 396/155; 348/370
See application file for complete search history.

(56) References Cited

U.S. PATENT DOCUMENTS

| | | | |
|---|---|---|---|
| 6,088,541 A * | 7/2000 | Meyer | 396/155 |
| 7,175,785 B2 | 2/2007 | Takeda et al. | |
| 2003/0103261 A1 * | 6/2003 | Hay | 359/352 |
| 2004/0120018 A1 * | 6/2004 | Hu | 358/506 |
| 2005/0071167 A1 | 3/2005 | Levin et al. | |

FOREIGN PATENT DOCUMENTS

| | | |
|---|---|---|
| WO | WO2004111720 | 12/2004 |
| WO | WO2007022985 | 3/2007 |
| WO | WO2007143374 | 12/2007 |

OTHER PUBLICATIONS www.3dlens.com; Linear Polarazer Film; dated Mar. 13, 2006.*
http://en.wikipedia.org/wiki/Polarizer; Polarizer, dated May 1, 2009.*
International Search Report; PCT/US2008/057800; Dec. 9, 2008; S. Isa.

* cited by examiner

*Primary Examiner* — Rodney E Fuller
(74) *Attorney, Agent, or Firm* — Fish & Richardson P.C.

(57) ABSTRACT

A reading machine includes an image input device including a lens and a polarizer disposed over the lens, a flash and a second polarizer disposed over the flash. The image input device also includes a computing device coupled to the image input device for capturing images, the computing device, including a processor to execute instructions and a computer program product residing on a computer readable medium, the computer program product comprising instructions for causing the processor to process the captured images to recognize features in the captured images.

23 Claims, 10 Drawing Sheets

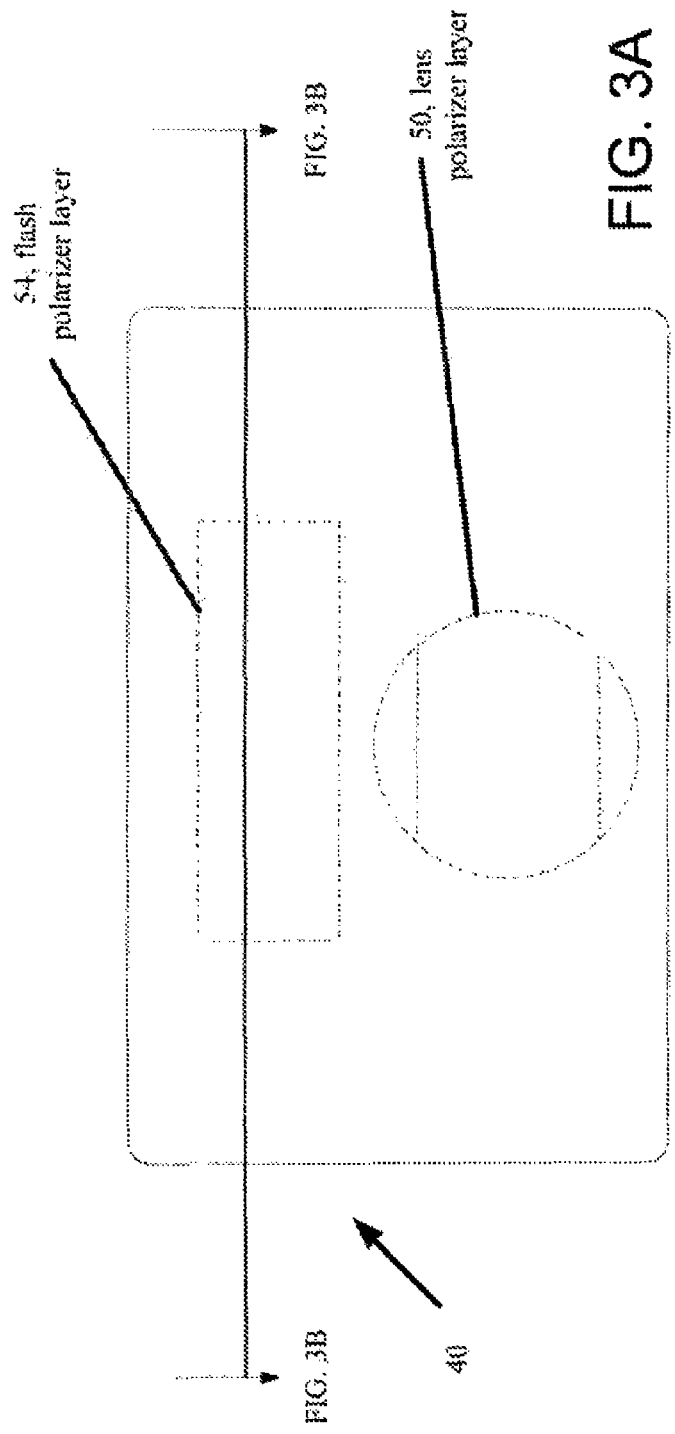
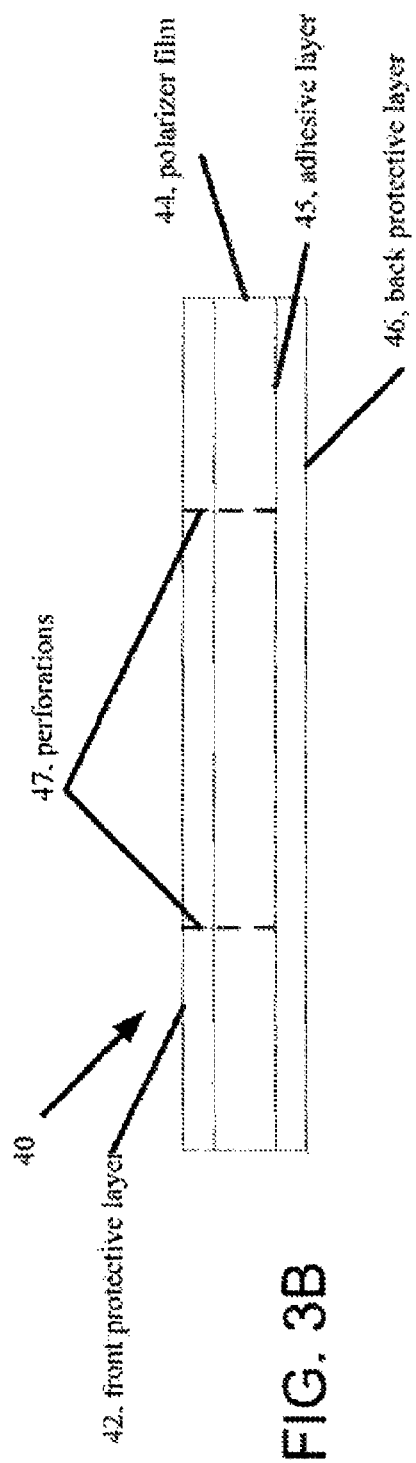
FIG. 3A
FIG. 3B

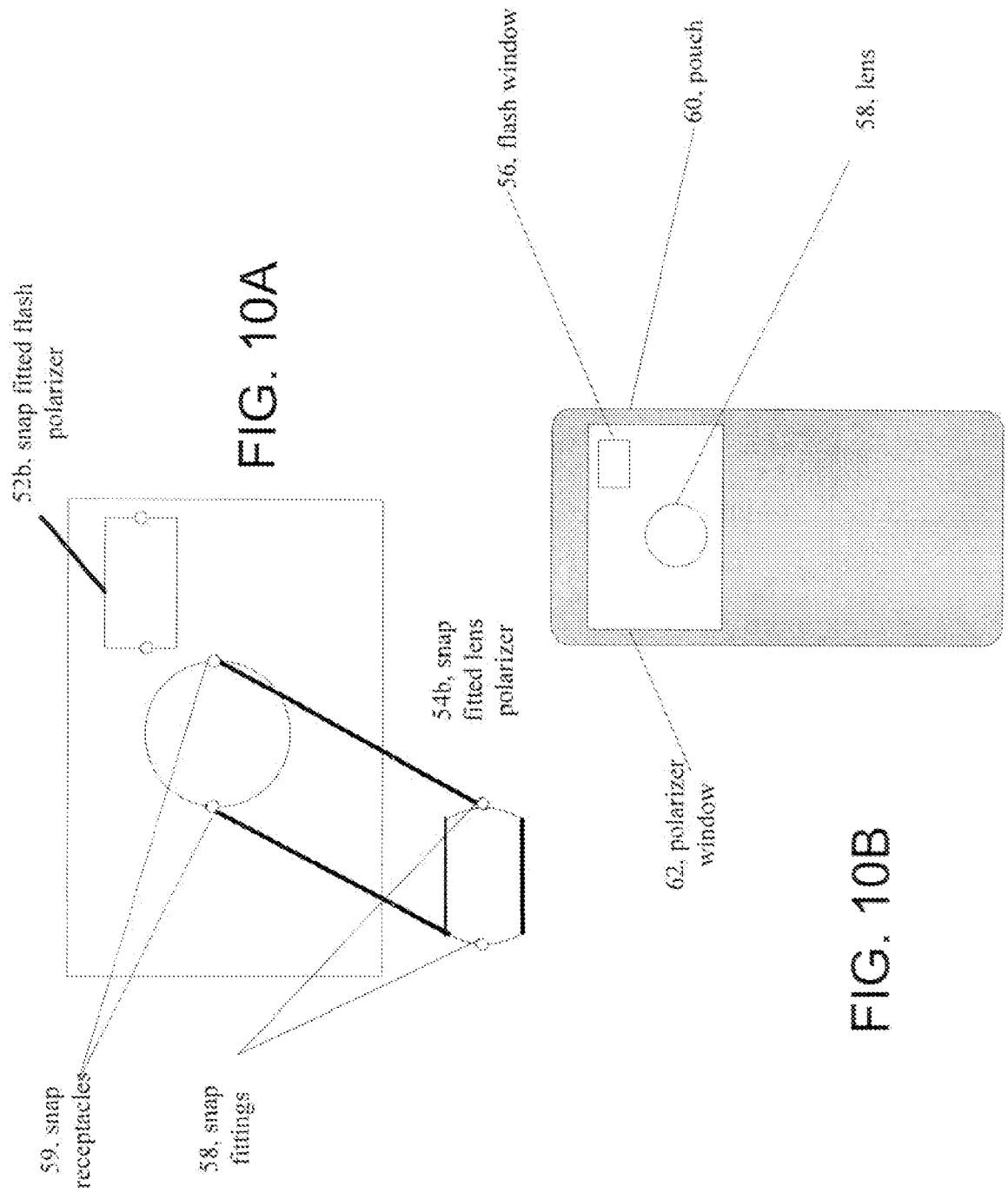

READING MACHINE WITH CAMERA POLARIZER LAYERS

BACKGROUND

Reading machines use optical character recognition (OCR) and text-to-speech (TTS) i.e., speech synthesis software to read aloud and thus convey printed matter to visually and developmentally impaired individuals. Reading machines read text from books, journals, and so forth.

Reading machines can use commercial off-the-shelf flatbed scanners, a personal computer and optical character recognition (OCR) software. The computer processes an image with the OCR software and produces a text file. The text file is fed to text-to-speech synthesis software to provide electrical signals that are fed to audio output devices to render speech and thus read any recognized text aloud to the user.

One manner in which a reading machine can capture an image is through an imaging device that is attached to the reading machine. One such use is to capture images of a scene to convey content of the scene to a user. A scene can represent contents of an image that is being read. A scene can be a memo or page of a book, or it can be a door in a hallway of an office building. The type of real-world contexts to "read" may include visual elements that are words, symbols or pictures, colors and so forth.

In addition to processing the image to recognize text, other recognition processes can include object recognition, such as recognizing faces, expressions on faces and so forth.

SUMMARY

In applications of reading machines with use of a flash to increase the light available to capture the image, there can be glare from glossy surfaces of a document or from, e.g., eyeglasses for facial recognition when a flash is used. Also there may be natural glare under strong lighting conditions all of which can interfere with recognition processing.

According to an aspect of the present invention, an image input device includes a lens, a flash window, a polarizer adhesively affixed over the lens and a polarizer adhesively affixed over the flash window, with the polarizer over the flash window having a linear polarization that is orthogonal to a linear polarization of the polarizer over the lens.

The following are embodiments within the scope of the invention.

The image input device is a camera. The polarizers are each a layer of a polarizer film having an adhesive on a surface thereof that attaches to the lens and flash window, and with the layers have a perimeter that is configured to orientate and align the polarizers in a correct polarization relative to each other when attached to the image input device.

According to another aspect of the present invention, a reading machine includes an image input device including a lens and a polarizer disposed over the lens, a flash and a second polarizer disposed over the flash. The image input device also includes a computing device coupled to the image input device for capturing images, the computing device, including a processor to execute instructions and a computer program product residing on a computer readable medium, the computer program product comprising instructions for causing the processor to process the captured images to recognize features in the captured images.

The following are embodiments within the scope of the invention.

The reading machine has the computer program product further including instructions to recognize text in the captured images and produce text and convert the recognized text to speech using text-to-speech software. The polarizers are adhesively affixed to the lens and flash window of the image input device. The image input device is a camera that produces images on which relevant text is recognized by applying the optical character recognition. The image input device is coupled to the computing device through a wireless communication link, in which the image input device wireless transmits image data to the processor. The image input device is coupled to the computing device, in which the image input device transmits image data to the processor over a physical interface. The reading machine further includes an audio output device and audio processing circuitry to receive an output from the text-to-speech synthesis and to generate an auditory signal that is rendered through the audio output device. The polarizer is a linear polarizer. The polarizers are linear polarizers and wherein the linear polarizers configured on the image input device in a manner that light from the flash has a polarization that is in perpendicular to the polarization of light that is captured by the lens. The polarizer includes a layer of a polarizer film, the layer having a surface with an optically transparent adhesive layer to allow the polarizer to be affixed to the lens. The polarizers each comprise a layer of a polarizer film, the layer having a surface with an optically transparent adhesive layer to allow the polarizers to be affixed to the lens and to the flash. The polarizers transmit only light having a first linear polarization and absorb light that has other than the first linear polarization. The polarizers are affixed to the image input device by a snap mechanism. The reading machine includes a pouch that houses the input device and wherein the polarizers are carried in a window of the pouch. The polarizers transmit only light having a first linear polarization, absorb light having other than the first linear polarization and improves the quality of the image captured by the image input device to increase the accuracy of the optical character recognition performed by the processor.

According to another aspect of the present invention, a polarizer includes a layer of a polarizer film, the layer having a first surface having an optically transparent adhesive layer thereon to allow the polarizer to be affixed to an optical element of a device.

The following are embodiments within the scope of the invention.

The polarizer includes a pair of protective layers over the polarizer film. The polarizer film is comprised of polyvinyl alcohol (PVA) plastic with an iodine dopant. The polarizer is a linear polarizer to transmit light having linear polarization and absorb light having other than the linear polarization. The polarizer includes a protective, disposable layer disposed over a front surface of the polarizer film, a protective, disposable layer disposed over a back surface of the polarizer film, with the back surface have an optically transparent adhesive thereon, and with the polarizer film and the protective, disposable layer disposed over a front surface of the polarizer film being perforated to allow the polarizer film and the protective, disposable layer disposed over a front surface of the polarizer film to be removed from the disposable layer disposed over the back surface of the polarizer film. The perforations are disposed to key a lens polarizer and a flash window polarizer to be configured for a particular image input device.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3A and 3B are diagrams depicting a polarizer kit.

FIGS. 10A and 10B show alternative attachment techniques for the polarizers.

DETAILED DESCRIPTION

Figure 1:
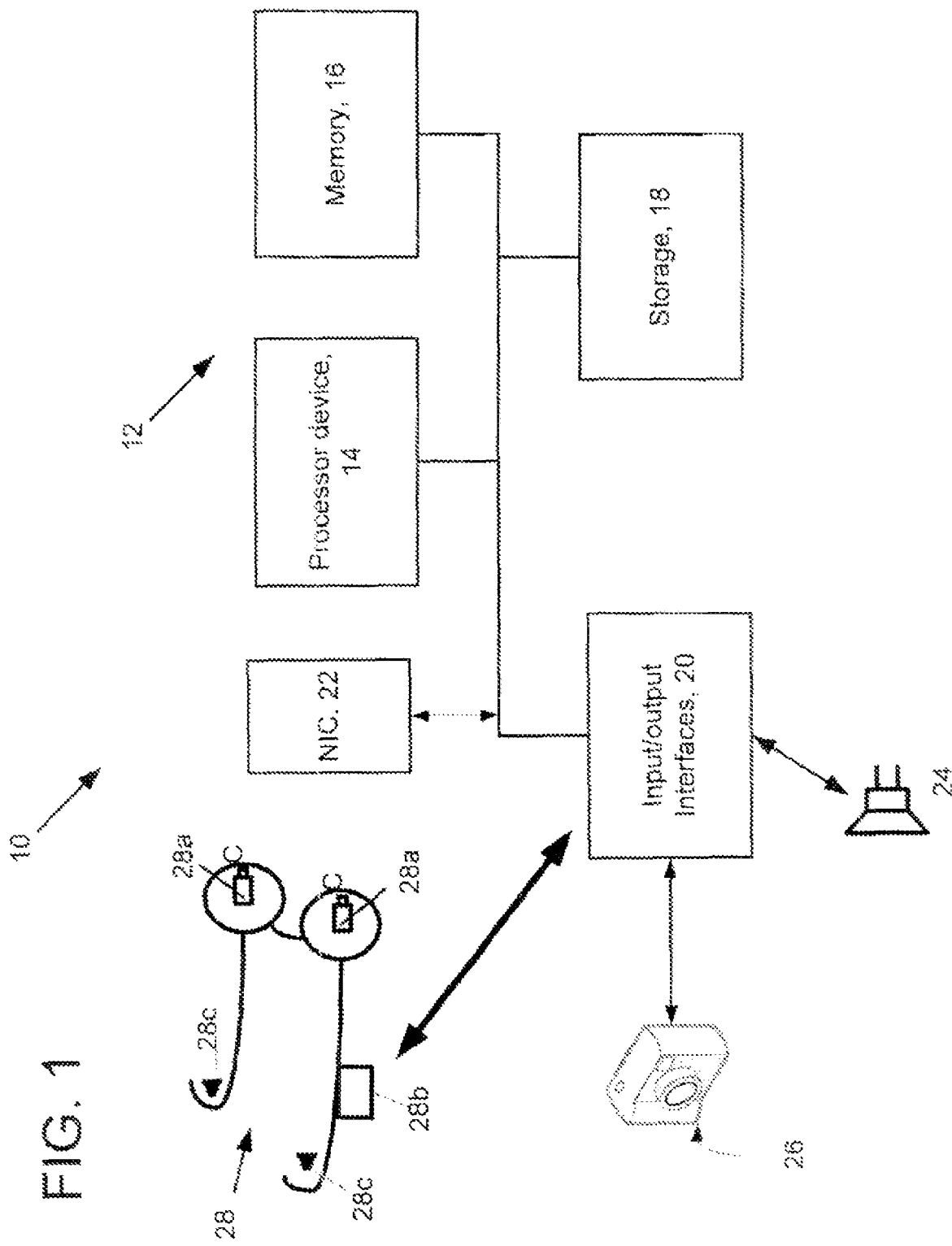
FIG. 1 is a block diagram of a portable reading machine with attached, portable imaging device.

Referring to FIG. 1 a configuration of a portable reading machine 10 is shown. The portable reading machine 10 includes a portable computing device 12 and image input device 26, as shown. The image input device 26 can be integrated into the reading machine 10. Alternatively, the portable reading machine 10 can be a camera with enhanced computing capability (that implements the functions of the portable computing device 12). The portable reading machine 10 can also be implemented as a mobile telephone, e.g., so-called smart phones such as the Nokia N95 (Nokia, Inc.) having an image input device and enhanced computing resources. Such a smart phone can be modified to have the computing resources execute application software that implements reading machine functionality (discussed below).

The image input device, e.g. a still camera, a video camera, portable scanner, etc, built-in camera on a cell phone, collects image data that is processed by portable computing device 12. The portable reading machine 10 has the image input device 26 coupled to the computing device 12 using a cable (e.g. USB, Firewire) or by wireless technology (e.g. Wi-Fi, Bluetooth, wireless USB) and so forth. An example is a consumer digital camera coupled to a pocket PC or a handheld Windows or Linux PC, a personal digital assistant and so forth which executes applications to implement reading machine functionality.

In general, as in FIG. 1, the portable computing device 12 of the portable reading machine 10 includes at least one processor device 14, memory 16 for executing computer programs and persistent storage 18, e.g., magnetic or optical storage, PROM, flash Prom or ROM and so forth that persistently stores computer programs and other data used by the reading machine 10. In addition, the portable reading machine 10 includes input and output interfaces 20 to interface the processing device to the outside world, such as to the image input device and user controls.

The portable reading machine 10 can include a network interface, device (not shown) to interface the reading machine to a network (including the Internet), e.g., to upload programs and/or data used in the reading machine 10. As a mobile phone, the phone can connect to the Internet, via the wireless carrier or to a local network via WiFI and Bluetooth. The network connectivity is useful for cooperative processing, in which the mobile device captures an image pre-processes the image to produce smaller bitmaps that could be sent to a more powerful computer for recognition processing. The recognized text (or object) information could be sent back to the mobile device.

The portable reading machine 10 includes an audio output device 24 to convey synthesized speech to the user from operation of the reading machine 10. The camera and audio devices can be coupled to the computing device using a cable (e.g. USB, Firewire) or using wireless technology (e.g. Wi-Fi, Bluetooth) etc. The portable reading machine 10 may have two cameras, or video input devices 26, one for high resolution and the other for lower resolution images. The lower resolution camera may be support lower resolution scanning for capturing gestures or directed reading, whereas the higher resolution one can be used to capture images that are process to recognize text and which text is used to synthesize speech.

The portable reading machine can be used with a pair of "eyeglasses" 28. The eyeglasses 28 may be integrated with one or more cameras 28a and coupled to the portable reading machine, via a communications link. The eyeglasses 26 provide flexibility to the user. The communications link 28b between the eyeglasses and the portable reading machine can be wireless or via a cable, as discussed above. The reading glasses 28 can have integrated speakers or earphones 28c to allow the user to hear the audio output of the portable reading machine.

Figure 2:
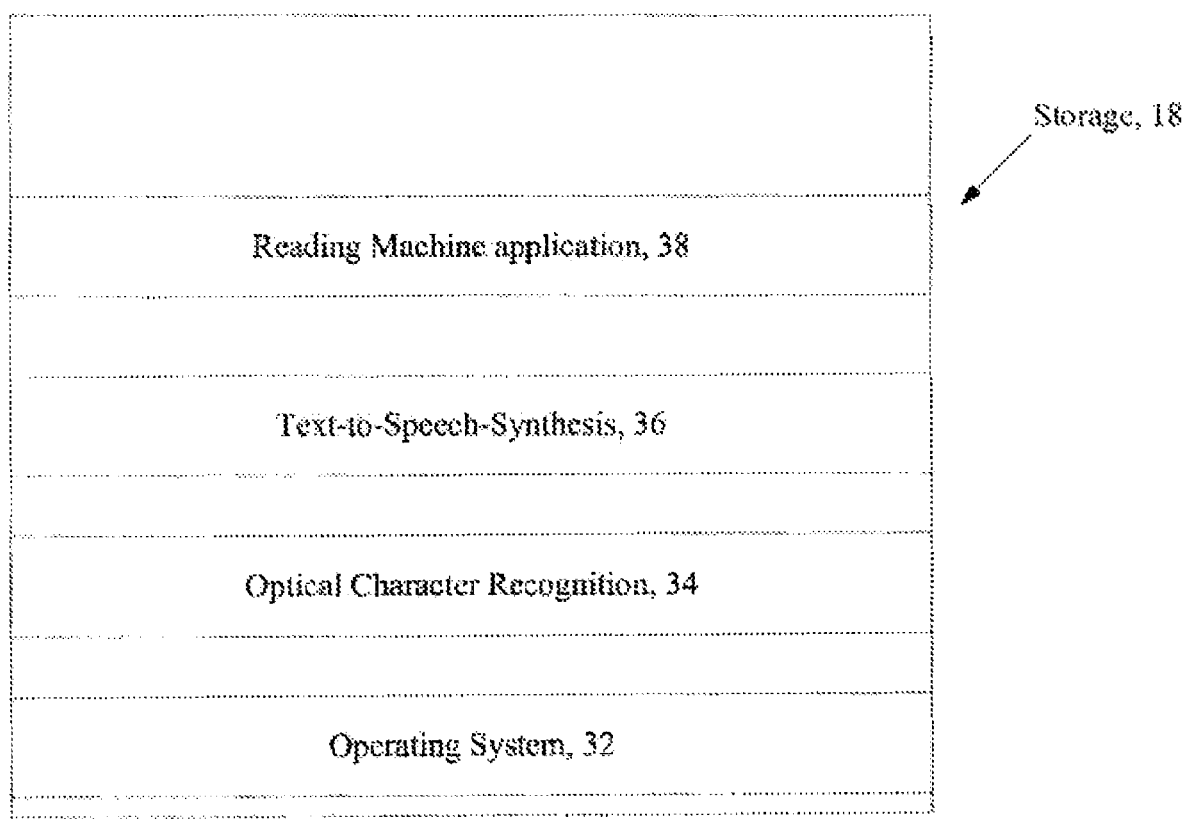
FIG. 2 is a block diagram.

Referring now to FIG. 2, elementary functions executed on the reading machine 10 are shown. Residing in storage 18 and executed in memory 16 under control of the processor 14 are an operating system 32, optical character recognition software 34 (or object recognition software), text-to-speech synthesis software 36 and a reading machine application 38 that accesses these software modules. The reading machine application 38 may include other more advanced functions and operate under different modes of operation as desired.

Referring now to FIG. 3, a polarizer kit 40 is shown. The polarizer kit is configured to be operable with the image input devices, especially if those devices are used, where varying lighting conditions can cause glare and other optical interference that can diminish the quality of the image and thus the effectiveness of OCR operation. For example, when the flash is used to image paper, often the paper has a glossy enough surface to produce glare that obliterates text. Magazines in particular have a very large amount of glare. The polarizers when installed on the image input device can improve performance in reading documents with a glossy finish. While the reader machine may continue to function normally without the polarizers, the reading quality may be sacrificed for glossy documents. While a user can tilt the camera at a slight angle from the text, to reduce the effects of glare, however this tilt would tend to also diminish the effectiveness of recognition processing, thus making it desirable to use the polarizers.

The polarizer kit includes a sheet of polarizer film 44, having a front protective layer 42 and a back protective layer 46. The protective layers 42, 46 are intended to be removed after installation. That is, the back protective layer is intended to be removed to allow the polarizer to be affixed to the device, whereas, the front protective layer 42 is intended to be removed before the first use of the imaging device. The back protective layer 46 protects an adhesive layer or surface 45 that is provided on the back surface of the polarizer film 44 and which back surface attaches to a lens or a flash window of the video input device 12, as will be discussed below. It is to be understood that the sheet of polarizer film 44 as well as the front protective layer 42 and the back protective layer 46 are relatively thin e.g., in a range of, e.g., 0.006" to 0.03" with 0.01" being a typical thickness, other thicknesses possible. The thicknesses are exaggerated in FIG. 2 for clarity in illustration. The protective layer's thickness is 0.003" other thicknesses are possible.

One such polarizer film is a linear polarizing Polyvinyl Alcohol-Iodine filter that polarizes in the visible light spectrum. The visible light transmission is 42% with an extinction transmittance of 1.7%. Optical density is measured using a beam of 100% linearly polarized light. Polarizers are available in 19"×50"×0.010" sheets obtained from American Polarizers, Inc. 141 South Seventh Street Reading, Pa. 19602 USA.

One example of an adhesive is a water-based acrylic pressure sensitive type adhesive. Such adhesives are high performance screen printable adhesives for instrument panels, touch panels, or appliques that can be selectively applied and provide substantially, permanent adhesion and high peel strength properties for the particular application. One such example is "NFi Printed Adhesive," a water based acrylic pressure sensitive adhesive obtained from Nameplates For Industry, Inc. 213 Theodore Rice Blvd. New Bedford, Mass. 02745. Other adhesives and adhesive types can be used, provided that they are substantially transparent to optical wavelengths of interest, compatible with the polarizer and the material of the lens and flash window.

Also disposed in the polarizer kit 40 are perforations 47 that define a flash polarizer 52 and lens polarizer 54 elements and permit the flash polarizer 52 and the lens polarizer 54 to be released from the protective layer 46.

The polarizers 52 and 54 converts incident un-polarized or mixed-polarization beam of electromagnetic waves (e.g., light) into an output beam with a single polarization state (e.g., a single linear polarization). The polarizer layer 44 can be comprised of a Polaroid™ film that is made from polyvinyl alcohol (PVA) plastic with an iodine doping. Stretching of the sheet during manufacture aligns the PVA chains in one particular direction. Electrons supplied by the iodine dopant are able to travel along the chains, ensuring that light polarized parallel to the chains is absorbed by the sheet; whereas light polarized perpendicularly to the chains is transmitted.

Thus, since each of the flash polarizer 52 and the lens polarizer 54 have a particular orientation it is important that the flash polarizer 52 and the lens polarizer 54 are applied in a manner that the polarizers have a polarization that are perpendicular to each other.

Figure 4:
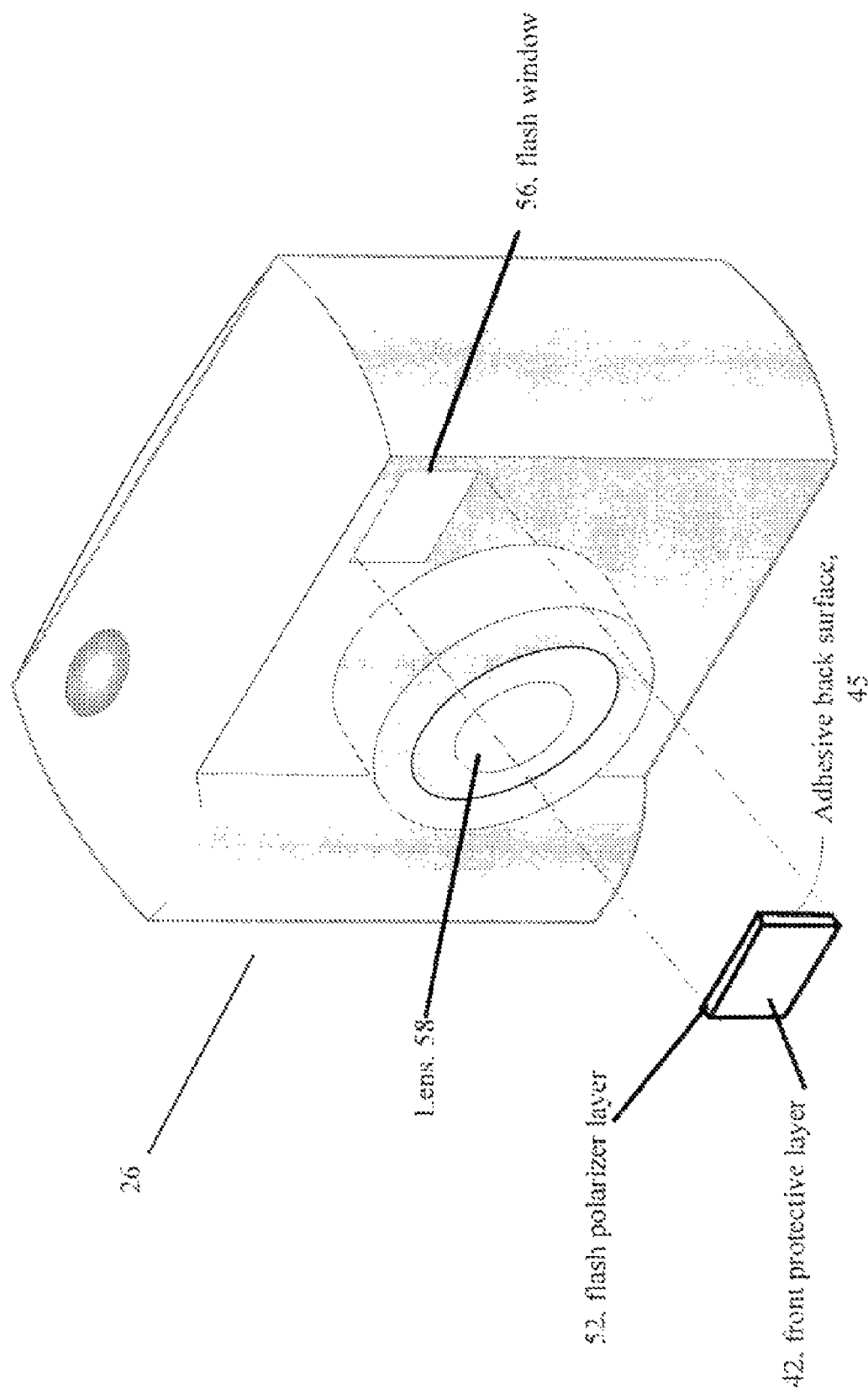
FIGS. 4-6 are diagrams depicting an image input device with polarizers.
Figure 5:
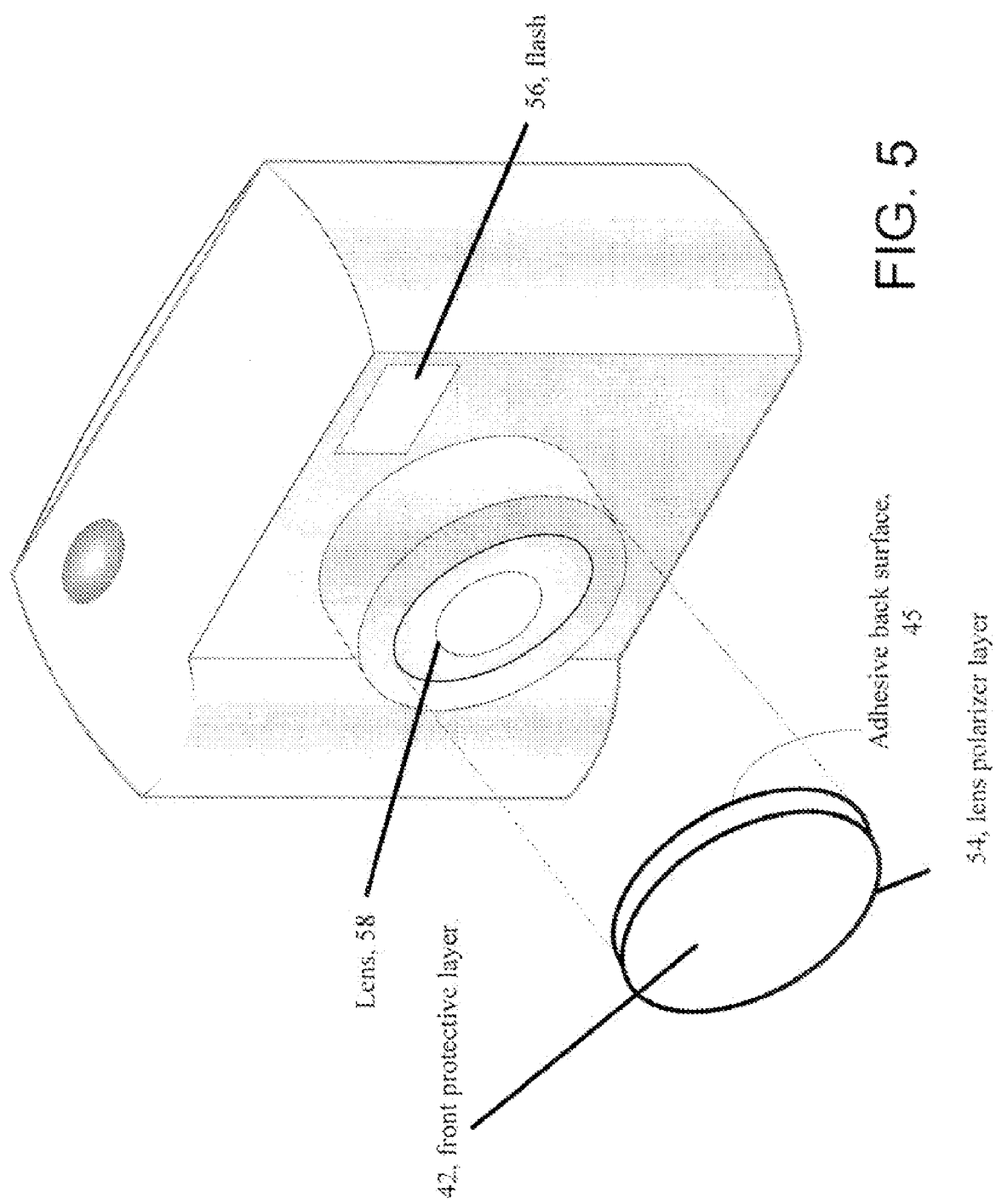
Figure 6:
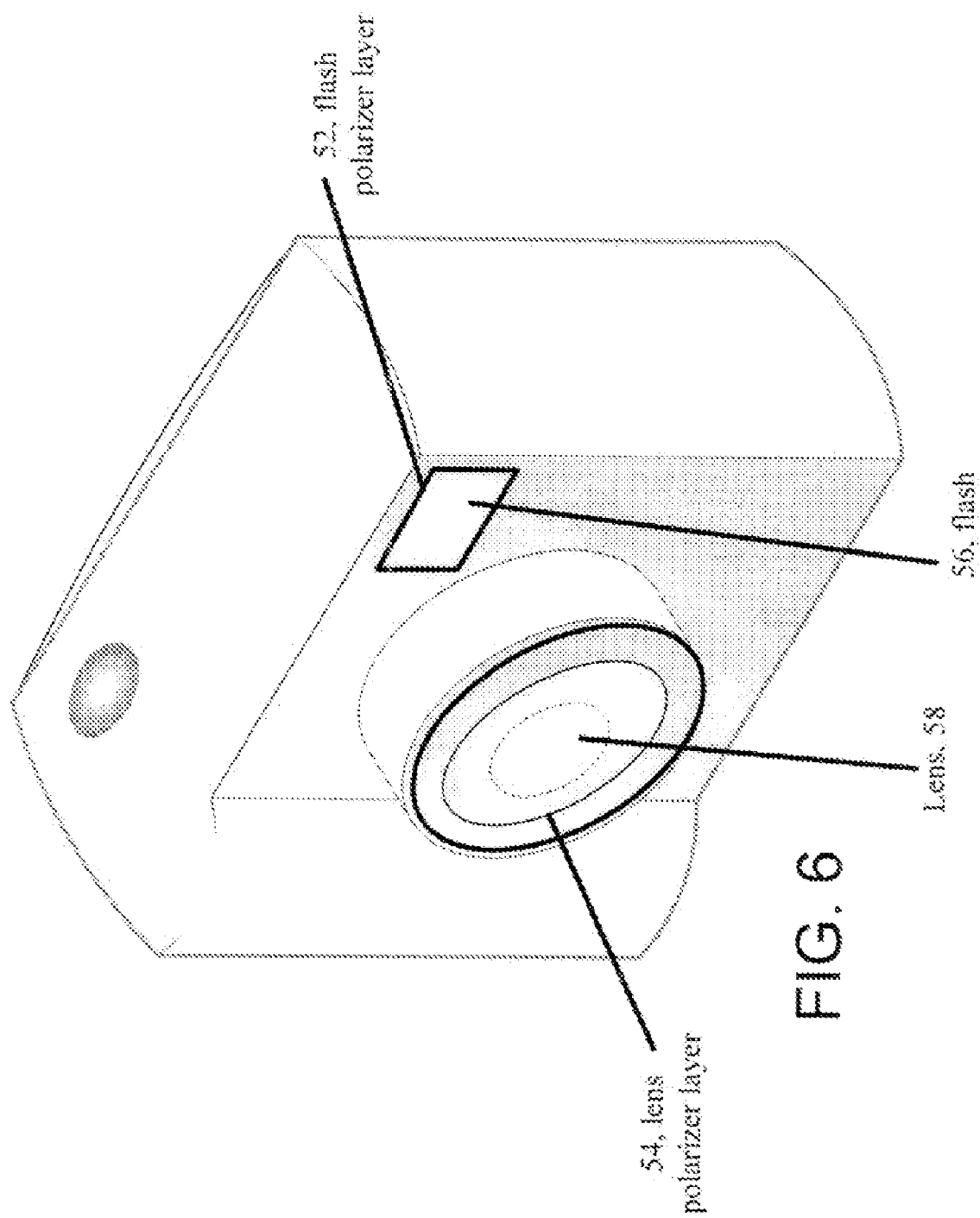

Referring now to FIGS. 4-6, steps in the process of applying the flash polarizer 52 and the lens polarizer 54 to the flash 56 and lens 58 of the image input device 26 are illustrated. Since misalignment of the polarizers can degrade text recognition, it is desirable that the polarizers are installed by a sighted person or that they polarizers are manufactured on the device in order to avoid misalignment.

In FIG. 4, the flash polarizer 52 is applied over flash window 56 and the front protective layer 42 on the flash polarizer 52 is subsequently removed. In FIG. 5, the lens polarizer 54 is applied over the lens 58 and the front protective layer 42 on the lens polarizer 54 is subsequently removed. Care is taken when removing the front protective layer 42 from both the flash polarizer 52 and the lens polarizer 54 so as not to detach the flash polarizer 52 and the lens polarizer 54 from the flash 56 and lens 58, respectively.

Figure 7:
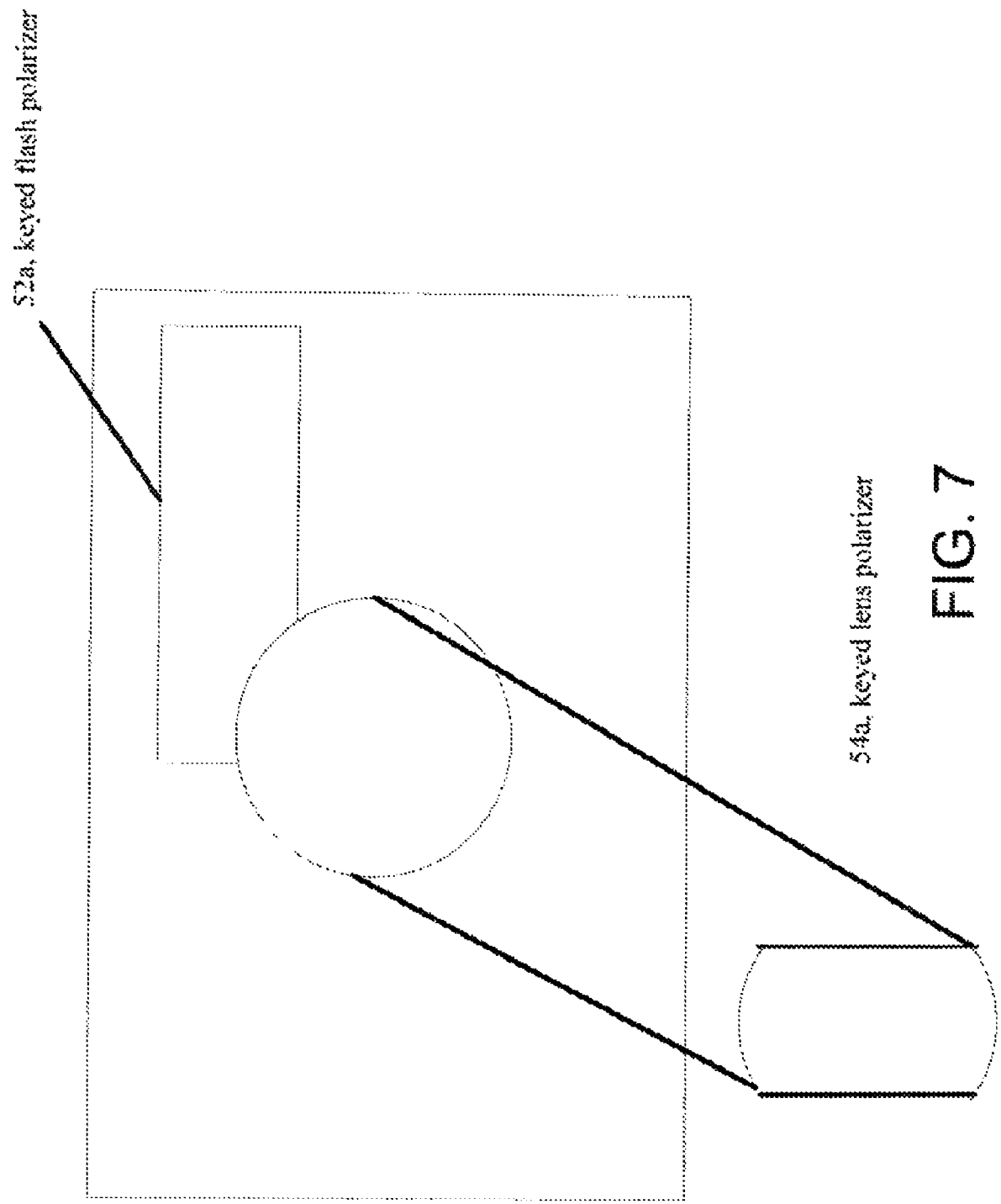
FIG. 7 is a diagram depicting an image input device with keyed polarizers.

As an aid to assist users in applying the flash polarizer 52 and the lens polarizer 54 to an image input device, keyed polarizers, such as a keyed flash polarizer 52a and a keyed lens polarizer 54a are provided. The keyed flash polarizer 52a and the keyed lens polarizer 54a are each provided with a perimeter that conforms at least a portion of the perimeter of the flash polarizer 52a and the keyed lens polarizer 54a to corresponding portions of the lens and flash window of the image input device. In other words, to assist in application of the polarizers to the lens and flash, the polarizers are customized in size and shape for particular models of such image input devices. For instance, as shown in FIG. 7, the keyed flash polarizer 52a has a shape that allows a portion of the perimeter of the keyed flash polarizer 52a to follow a contour of the housing for the lens. Similarly, the keyed lens polarizer 54a has truncated upper and lower edges of the perimeter that could be used to assist the user in applying the keyed lens polarizer 54a to the lens such that those edges are parallel to a reference on the image input device, and so forth.

Figure 8:
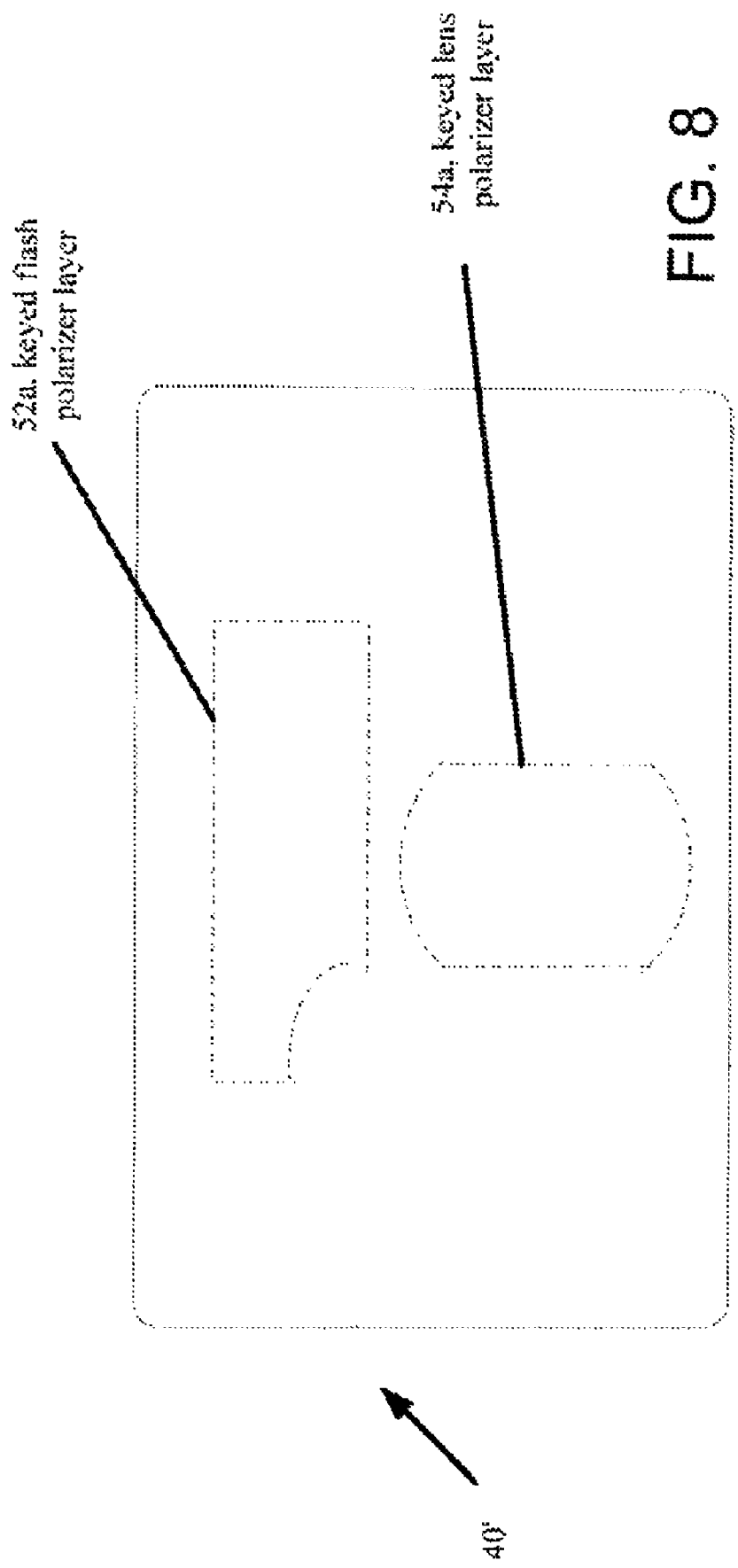
FIG. 8 is a plan view of an alternative polarizer kit.

A corresponding kit 40' is shown in FIG. 8 with the keyed flash polarizer 52a and the keyed lens polarizer 54a.

Figure 9:
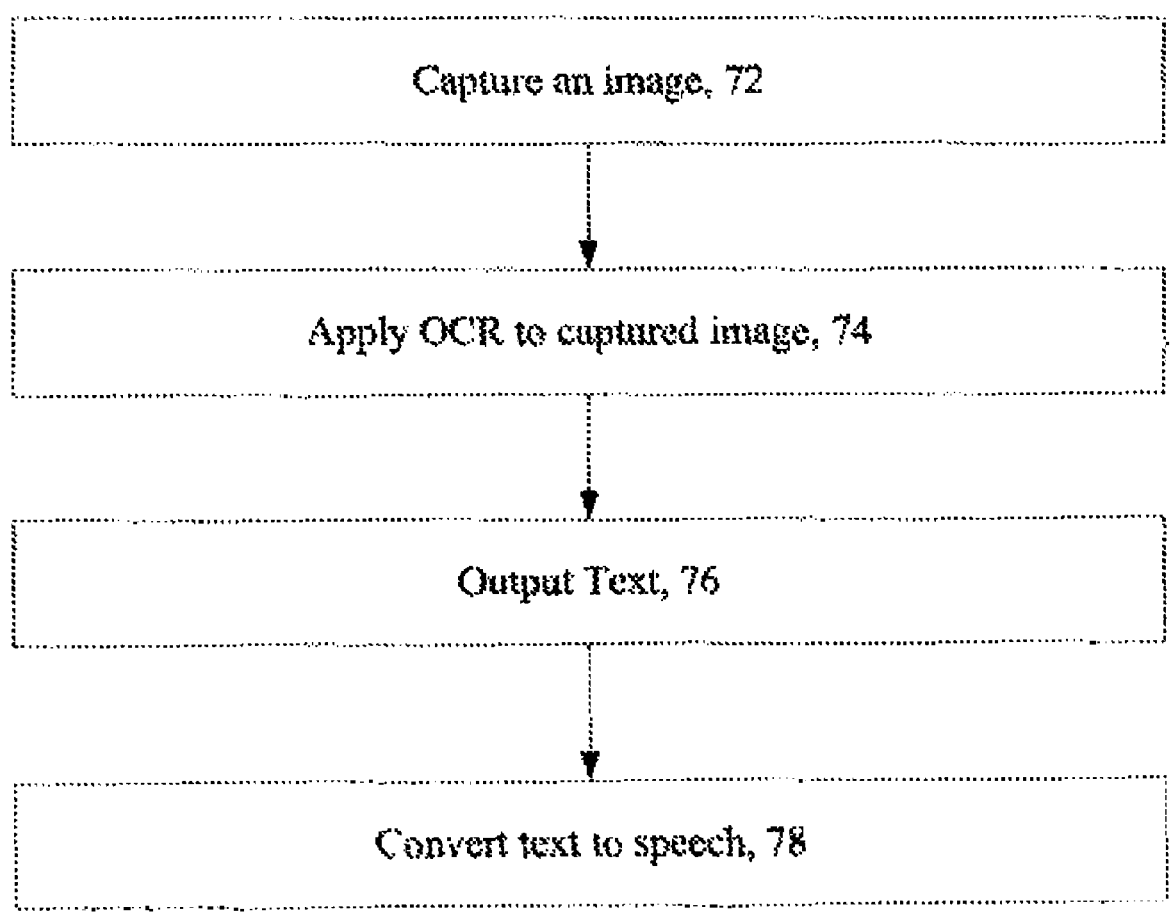
FIG. 9 is a flow chart.

Referring to FIG. 9, operation of the reading machine 10 is shown. In one mode of operation, the reading machine application 38 in conjunction with the image input device 26 causes the reading machine 10 to capture 72 an image of a scene, e.g., document, outdoor environment, device, etc. The reading machine application 38 processes the image in the computing system 12. Part of the processing of the image includes optical character recognition (OCR) processing 74 on the image. Processing of the image, results in an output 76 of text, e.g., as a text file or data structure. The text file or data structure is inputted 78 to a text-to-speech application 76 that converts the text to electrical signals that are rendered as speech.

The polarizers once installed on the image input device with the protective layer removed, should be protected from scratches, dirt, and direct sunlight. Intense heat may affect the polarizer's adhesion to the lens or flash window. The polarizers should not be touched with fingers or any cutting material or come in contact with dirty surfaces. Ideally, the image input device is stored in a pouch with the reader to protect the surfaces.

The polarizers may be cleaned using a soft piece of fabric, such as the type of fabric used to clean regular glasses.

The polarizers for the camera flash output may require a replacement after approximately one year of use. The need for a replacement is indicated when the quality of the text recognition appears to be decreasing. Misalignment of the polarizers can also degrade text recognition.

Other arrangements are possible. For instance the polarizers can be provided as individual units that fittings 58 which clip into receptacles 59 provided in the image input device 12, as shown in FIG. 10A. For instance, the polarizers can be carried by a plastic frame that has protrusions 58 that snap into receptacles 59 adjacent the flash and lens on an image input device.

As shown in FIG. 10B, a pouch assembly 60 that is used to carry the image input device can be have regions 62 that are comprised of the polarization film at the proper orientation over the flash 56 and over the lens 58, when the image input device is fitted into the pouch 60

A number of embodiments of the invention have been described. Nevertheless, it will be understood that various modifications may be made without departing from the spirit and scope of the invention. For example, the polarizer is shown as a film having an adhesive surface. Alternatively, the polarizer can be built into the image input device or can be affixed to the lens and flash of the image input device via other mechanisms such as by use of a frame that hold the polarize and attaches to the lens and/or flash using a threaded, a bayonet or other mechanical affixation. In addition, other keying mechanisms could be used. Accordingly, other embodiments are within the scope of the following claims.

What is claimed is:

1. A device comprising:
   an image input device comprising:
      a lens;
      a first polarizer disposed over the lens the first polarizer having a perimeter a contour of which is configured to orientate and align the polarizer to the lens;
      a flash; and a second polarizer disposed over the flash, the second polarizer having a perimeter a contour of which is configured to orientate and align the polarizer to the flash and in an orthogonal polarization relative to the polarization of the first polarizer on the lens;

a pouch that houses the input device with the polarizers carried in respective windows of the pouch and with the respective widows aligned with the lens and flash respectively;

a computing device coupled to the image input device for capturing images, the computing device, comprising:

a processor to execute instructions; and a computer program product residing on a computer readable medium, the computer program product comprising instructions for causing the processor to:

process the captured images;

recognize features in the captured images to determine a presence of text in the captured image;

recognize the text present in the captured image and produce text; and convert the recognized text to speech using text-to-speech software.

2. The device of claim 1 wherein the polarizers are adhesively affixed to the lens and flash window of the image input device.

3. The device of claim 2 wherein the image input device is a camera that produces images on which relevant text is recognized by applying the optical character recognition.

4. The device of claim 1 wherein the image input device is coupled to the computing device through a wireless communication link, in which the image input device wireless transmits image data to the processor.

5. The device of claim 4 wherein the image input device is coupled to the computing device, in which the image input device transmits image data to the processor over a physical interface.

6. The device of claim 1 wherein the reading machine further comprises:

an audio output device; and audio processing circuitry to receive an output from the text-to-speech synthesis and to generate an auditory signal that is rendered through the audio output device.

7. The device of claim 1 wherein the first polarizer is a linear polarizer.

8. The device of claim 1 wherein the polarizers are linear polarizers and wherein the linear polarizers are configured on the image input device in a manner that light from the flash has a polarization that is in perpendicular to the polarization of light that is captured by the lens.

9. The device of claim 1 wherein the first polarizer comprises a layer of a polarizer film, the layer having a surface with an optically transparent adhesive layer to allow the polarizer to be affixed to the lens.

10. The device of claim 1 wherein the polarizers each comprise a layer of a polarizer film, the layer having a surface with an optically transparent adhesive layer to allow the polarizers to be affixed to the lens and to the flash.

11. The device of claim 1 wherein the polarizers transmit only light having a first linear polarization and absorb light that has other than the first linear polarization.

12. The device of claim 1 wherein the polarizers are affixed to the image input device by a snap mechanism.

13. The device of claim 1 wherein the polarizers transmit only light having a first linear polarization, absorb light having other than the first linear polarization and improves the quality of the image captured by the image input device to increase the accuracy of the optical character recognition performed by the processor.

14. A device comprising:

an image input device;

a pouch with a body portion for holding the image input device;

a polarizer layer disposed in a portion of the pouch body, the polarizer layer configured to be aligned with the image capturing device when the image capturing device is disposed in the pouch; and a computing device coupled to the image input device for capturing images, the computing device, comprising:

a processor to execute instructions; and a computer program product residing on a computer readable medium, the computer program product comprising instructions for causing the processor to:

process the captured images;

recognize features in the captured images to determine a presence of text in the captured image;

recognize text in the captured images and produce text; and convert the recognized text to speech using text-to-speech software.

15. The device of claim 14 wherein the image input device is a camera that produces images on which relevant text is recognized by applying optical character recognition.

16. The device of claim 14 wherein the image input device is coupled to the computing device through a wireless communication link, by which the image input device wirelessly transmits image data to the processor.

17. The device of claim 14 wherein the image input device is coupled to the computing device, in which the image input device transmits image data to the processor over a physical interface.

18. The device of claim 14 wherein the device further comprises:

an audio output device; and audio processing circuitry to receive an output from the text-to-speech synthesis and to generate an auditory signal that is rendered through the audio output device.

19. The device of claim 14 wherein the polarizers have a linear polarization.

20. The device of claim 14 wherein the polarizers are linear polarizers and the linear polarizers are configured on the image input device in a manner that light from the flash has a polarization that is perpendicular to the polarization of light that is captured by the lens.

21. The device of claim 14 wherein the polarizers comprise a layer of a polarizer film, the layer having a surface with an optically transparent adhesive layer to allow the polarizer to be affixed to a portion of the pouch.

22. The device of claim 14 wherein the polarizers wherein the polarizers are affixed to the pouch by a snap mechanism.

23. The device of claim 14 wherein the polarizers are carried in a optically transparent window portion of the pouch.

* * * * *

UNITED STATES PATENT AND TRADEMARK OFFICE
CERTIFICATE OF CORRECTION

| | | |
|---|---|---|
| PATENT NO. | : 7,949,245 B2 | Page 1 of 1 |
| APPLICATION NO. | : 11/689569 | |
| DATED | : May 24, 2011 | |
| INVENTOR(S) | : Lev Lvovsky et al. | |

It is certified that error appears in the above-identified patent and that said Letters Patent is hereby corrected as shown below:

On Title page of patent at (75) Inventors, please:

delete "Paul Albrecht, Brighton, MA (US)" and replace with "Paul Albrecht, Bedford, MA (US);"

Signed and Sealed this
Eleventh Day of March, 2014

Michelle K. Lee
*Deputy Director of the United States Patent and Trademark Office*